United States Patent
Mykhailenko et al.

(10) Patent No.: US 9,195,872 B2
(45) Date of Patent: Nov. 24, 2015

(54) OBJECT TRACKING METHOD AND APPARATUS

(71) Applicant: Samsung Electronics Co., Ltd., Suwon-si, Gyeonggi-do (KR)

(72) Inventors: Anton Mykhailenko, Kiev (UA); Fedir Zubach, Kiev (UA); Ikhwan Cho, Suwon-si (KR); Kyusung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/178,657

(22) Filed: Feb. 12, 2014

(65) Prior Publication Data

US 2014/0231501 A1 Aug. 21, 2014

Related U.S. Application Data

(60) Provisional application No. 61/765,467, filed on Feb. 15, 2013.

(30) Foreign Application Priority Data

Jan. 9, 2014 (KR) ........................ 10-2014-0002702

(51) Int. Cl.
*G06K 7/10* (2006.01)
*G06K 7/14* (2006.01)

(52) U.S. Cl.
CPC ............ *G06K 7/1443* (2013.01); *G06K 7/1456* (2013.01)

(58) Field of Classification Search
CPC ........ G06Q 30/02; G07F 7/1008; G06K 7/14; G06K 7/10851; G06K 7/10722
USPC ................................ 235/375, 462.08, 462.11
See application file for complete search history.

(56) References Cited

U.S. PATENT DOCUMENTS

2010/0276481 A1* 11/2010 Silverbrook et al. ......... 235/375

OTHER PUBLICATIONS

Yu-Hsuan Chang, 'A General Scheme for Extracting QR Code from a non-uniform background in Camera Phones and Applications' Dec. 10, 2007.
Tai-Wei Kan, 'Applying QR Code in Augmented Reality Applications', Dec. 14, 2009.

* cited by examiner

*Primary Examiner* — Karl D Frech
(74) *Attorney, Agent, or Firm* — Jefferson IP Law, LLP

(57) ABSTRACT

An object tracking method and device of an electronic device are provided. The object tracking method of the electronic device includes tracking an object recognized in at least one digital image, wherein the tracking of the object includes generating a reference object using at least a part of the object recognized in the at least one digital image, and tracking the object using the reference object.

17 Claims, 13 Drawing Sheets

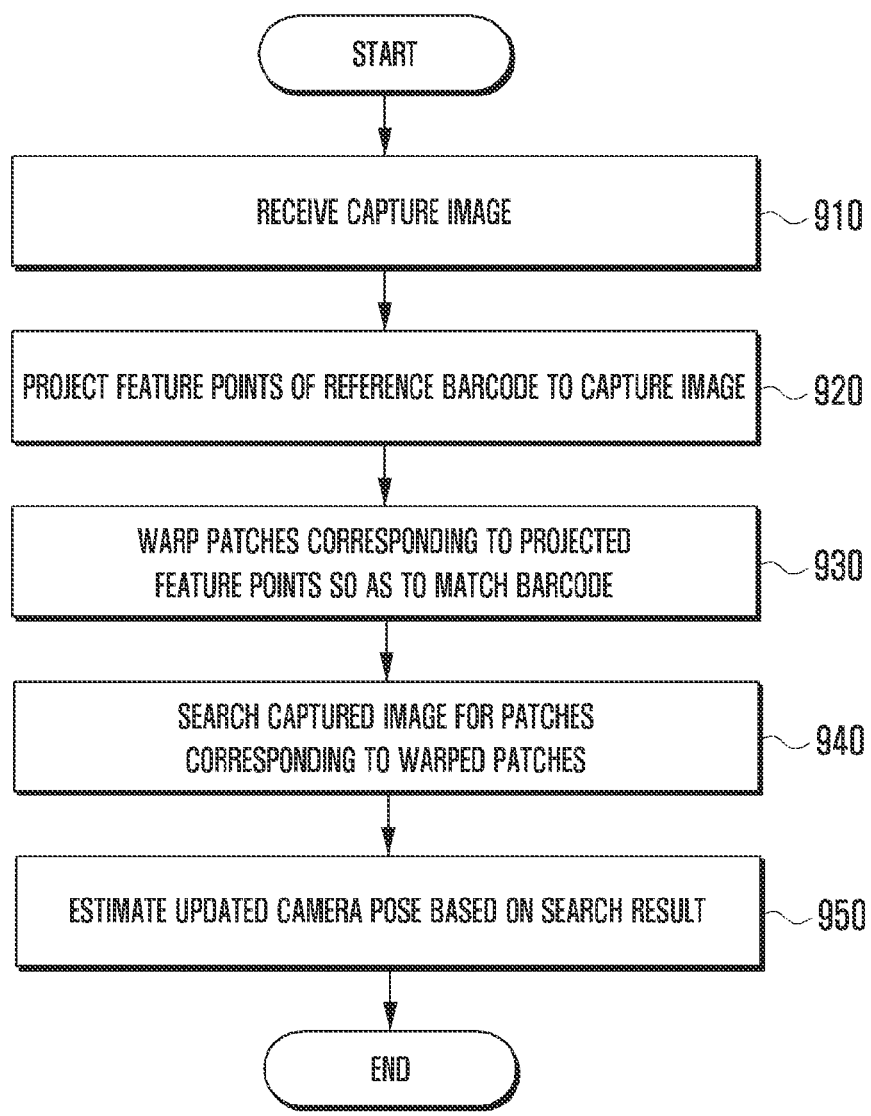

OBJECT TRACKING METHOD AND APPARATUS

CROSS-REFERENCE TO RELATED APPLICATION(S)

This application claims the benefit under 35 U.S.C. §119 (e) of a U.S. Provisional application filed on Feb. 15, 2013 in the U.S. Patent and Trademark office and assigned Ser. No. 61/765,467, and under 35 U.S.C. §119(a) of Korean patent application, filed on Jan. 9, 2014 and assigned Ser. No. 10-2014-0002702, the entire disclosure of which is hereby incorporated by reference.

TECHNICAL FIELD

The present disclosure related to an electronic device. More particularly, the present disclosure relates to an object tracking method and device of the electronic device.

BACKGROUND

Object tracking is tracking an object, e.g. an image, a text, a barcode, or any other similar and/or suitable object, recognized by a computer. Most electronic devices may be equipped with a technique of tracking an object. For example, portable terminals, such as smartphone and tablet Personal Computer (PC), are equipped with the technique of tracking Quick Response (QR) code. The barcode tracking technology is equipped in various electronic devices and appliances.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Aspects of the present disclosure are to address at least the above-mentioned problems and/or disadvantages and to provide at least the advantages described below. Accordingly, an aspect of the present disclosure is to provide methods capable of overcoming the above problems in addition to other purposes. The object tracking apparatus and method of the present disclosure is robust to various obstacle elements (e.g. camera motion and motion blur) and capable of locating the position of the barcode of high quality in real time. Here, the expression 'robust' means that the barcode tracking is less influenced by the impact of obstacle elements. The object tracking method and apparatus of the present disclosure is applicable to real time image processing and computer vision fields.

A related-art barcode tracking technology deals with the barcode as an image. That is, the related-art barcode tracking technology extracts a barcode from the image captured by a camera (a part of the captured image) and acquires the position of the barcode based on the information of the extracted barcode. However, such a barcode tracking technology is inefficient in view of quality and performance because the barcode extraction and decoding process is sensitive and not robust to the motion of the camera. Also, it may be difficult to recognize the barcode from the capture image due to an unintended obstruction, lighting artifacts, and motion blur. For this reason, the captured image may impact negative influence to the tracking quality In accordance with an aspect of the present disclosure, a method for operating an electronic device is provided. The method includes tracking an object recognized in at least one digital image, and the tracking of an object includes generating a reference object using at least a part of the object recognized in the at least one digital image and tracking the object using the reference object.

In accordance with another aspect of the present disclosure, a method for operating an electronic device is provided. The method includes localizing a barcode as an object in a captured image, extracting data from the barcode, generating an original of the barcode using the data, acquiring feature points from the original of the barcode, and tracking the barcode using the feature points.

In accordance with another aspect of the present disclosure, a method of operating an electronic device is provided. The method includes receiving a captured image, localizing a barcode as an object from the captured image, extracting data from the barcode, and displaying at least one of the data, a part of the data, and information related to the data on the barcode.

In accordance with another aspect of the present disclosure, an electronic device is provided. The electronic device includes a memory configured to store at least one digital image and a processor configured to track an object recognized in the at least one digital image, wherein the processor is configured to generate a reference object using at least a part of the object recognized from the at least one digital image for tracking and to track the object using the reference object.

In accordance with another aspect of the present disclosure, an electronic device is provided. The electronic device includes a camera configured to capture an image and a control unit configured to detect a barcode from the captured image and tracks the barcode, and the control unit is configured to localize the barcode as an object in the captured image, to extract data from the barcode, to generate an original of the barcode using the data, to acquire feature points from the original, and to track the barcode using the feature points.

In accordance with another aspect of the present disclosure, an electronic device is provided. The electronic device includes a camera configured to capture an image; a display unit configured to display the captured image and a control unit configured to extract a barcode from the captured image and to track the barcode, and the control unit is configured to localize a barcode as an object from the captured image, to extract data from the barcode, and to control the display unit to display at least one of the data, a part of the data, and information related to the data on the barcode.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a flowchart illustrating a feature points-based barcode tracking procedure of an object tracking method according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, an electronic device may be any of various camera-equipped devices including a smartphone, a tablet Personal Computer (PC), a laptop PC, a digital camera, a computer monitor, a Personal Digital Assistant (PDA), an electronic organizer, a desktop PC, a Portable Multimedia Player (PMP), a Media Player, e.g. an Motion Picture Experts Group (MPEG) Audio Layer 3 (MP3) player, an audio device, a wrist watch, a gaming console, a touch-screen-enabled electronic appliance, e.g. a refrigerator, a Television (TV), a laundry machine, or any other similar and/or suitable electronic device.

Detailed description is made of a barcode tracking method and electronic device according to an embodiment of the present disclosure hereinafter. The terms and words used in this description and the appended claims are not to be interpreted in common or lexical meaning but, based on the principle that an inventor can adequately define the meanings of terms to best describe the disclosure, to be interpreted in the meaning and concept conforming to a technical concept of the present disclosure. Thus, it should be understood that there may be various equivalents and modified examples that may replace an embodiment described in the present disclosure and a configuration shown in drawings at a time of filling the present disclosure. Detailed description of well-known functions and structures incorporated herein may be omitted to avoid obscuring subject matter of the present disclosure.

Figure 1:
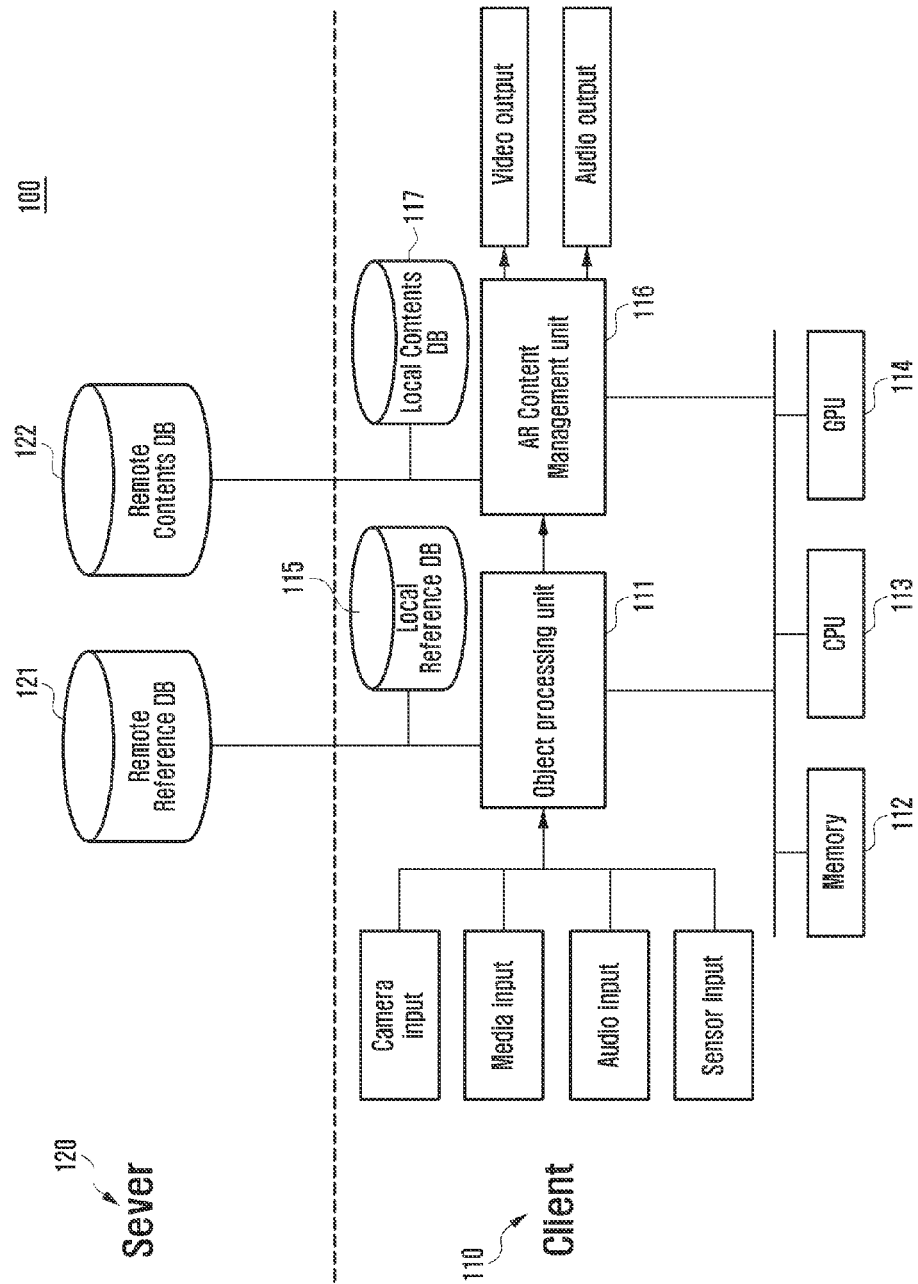
FIG. 1 is a block diagram illustrating an object processing system according to an embodiment of the present disclosure.

FIG. 1 is a block diagram illustrating an object processing system according to an embodiment of the present disclosure.

Referring to FIG. 1, an object processing system 100 includes a client 110, a server 120, and a communication network.

In the object processing system 100, the client 110 is equipped with an object tracking function. The object processing system 100 is capable of establishing a communication channel between the server 120 and the client 110 using a communication unit of the client 110. Information used in supporting and/or providing the object tracking function is provided from the server 120 to the client 110. In the present disclosure, the client 110 may receive data retained in the server 120 to perform the object tracking function based on the received data.

In the object processing system 100, the client 110 may be an electronic device, as described above, and may connect to the server 120 through the communication network. The client 110 may send the acquired image information to the server 120. Particularly, the client 110 may send the acquired image information to the server 120 in real time. The server 120 performs a phase correlation operation for tracking an object based on the received image information and sends a result value of the phase correlation operation to the client 110. The client 110 may support more efficient data processing for tracking an object as compared to the operation for tracking the object using the image information based on the values provided by the server 120. The client 110 may receive a remote reference object and content data provided by the server 120. The client 110 may perform image recognition and object localization using the remote reference object. The client 110 also may control such that the content data is applied to an Augmented Reality (AR) service.

A processor (not shown) of the client 110 may recognize an object on a digital image, may generate a reference object according to at least a part of the recognized object, and may track the recognized object according to the reference object. When generating the reference object, any error included in the recognized object may be corrected. The processor may determine whether the error of the recognized object is corrected successfully. In a case where the recognized object includes a barcode, the processor may extract data from the barcode, may correct any error in the extracted barcode, and may decode the error-corrected data. Also, if the recognized object includes the barcode, the processor may generate a reference barcode according to at least a part of the recognized object, may extract feature points from the reference barcode, and may track the object according to the feature points.

In the object processing system 100, the client 110 may be embedded in the electronic device and may include an object processing unit 111 as a main unit. The object processing unit 111 may receive camera input data, media input data, audio input data, sensor input data, and any other similar and/or suitable data, from a camera, a media unit, an audio unit, a sensor unit, and any other similar and/or suitable data generating unit, respectively. For example, the sensor input data may include the data from at least one of an acceleration meter, a gyroscope, a magnetic sensor, a temperature sensor, a gravity sensor, and any other similar and/or suitable sensor.

The object processing unit 111 may use a memory 112, a Central Processing Unit (CPU) 113, and a Graphic Processing Unit (GPU) 114. The object processing unit 111 also may use a reference database (DB) for identify a target, e.g. a QR code and may detect the target, e.g. the QR code, from among recognized objects. The reference DB may include a local reference DB 115 of the client 110 and a remote reference DB 121 of the server 120. Data output from the object processing unit 111 may include identification information and localization information. The localization information may be used for determining a 2 Dimensional (2D) pose and/or a 3 Dimensional (3D) pose of the target. The identification information may be used for determining the identity of the object. An AR content management unit 116 may be used for organizing the output data of the object processing unit 111 and video/audio output data of content stored in a remote contents DB 122 and a local contents DB 117.

In the object processing system 110, the client 110 may connect to the server 120. The server 120 executes the object tracking function and an AR service function in response to a request from the client 110. The server 120 may have the remote reference DB 121 to support the object tracking function. The server 120 also may perform at least one of image information recognition process, localization process, and object tracking process in response to a request from the client. The server 120 also may provide the client 110 with execution results of the processes in response to a request from the client 110.

In the object processing system 100, the communication network may be interposed between the client 110 and the server 120. The communication network may establish a communication channel between two nodes, such as the client 110 and the server 120. In a case where the client 110 supports a cellular communication function, the communication network may include cellular network devices. In a case where the server 120 operates on the Internet, the communication network may include devices supporting Internet Protocol (IP). The communication network may further include network devices for relaying data between heterogeneous networks. In an embodiment of the present disclosure, the communication network is not limited to a specific communication protocol or communication, but may be construed as a network accommodating various devices and methods capable of communicating data between the client 110 and the server 120.

Figure 2:
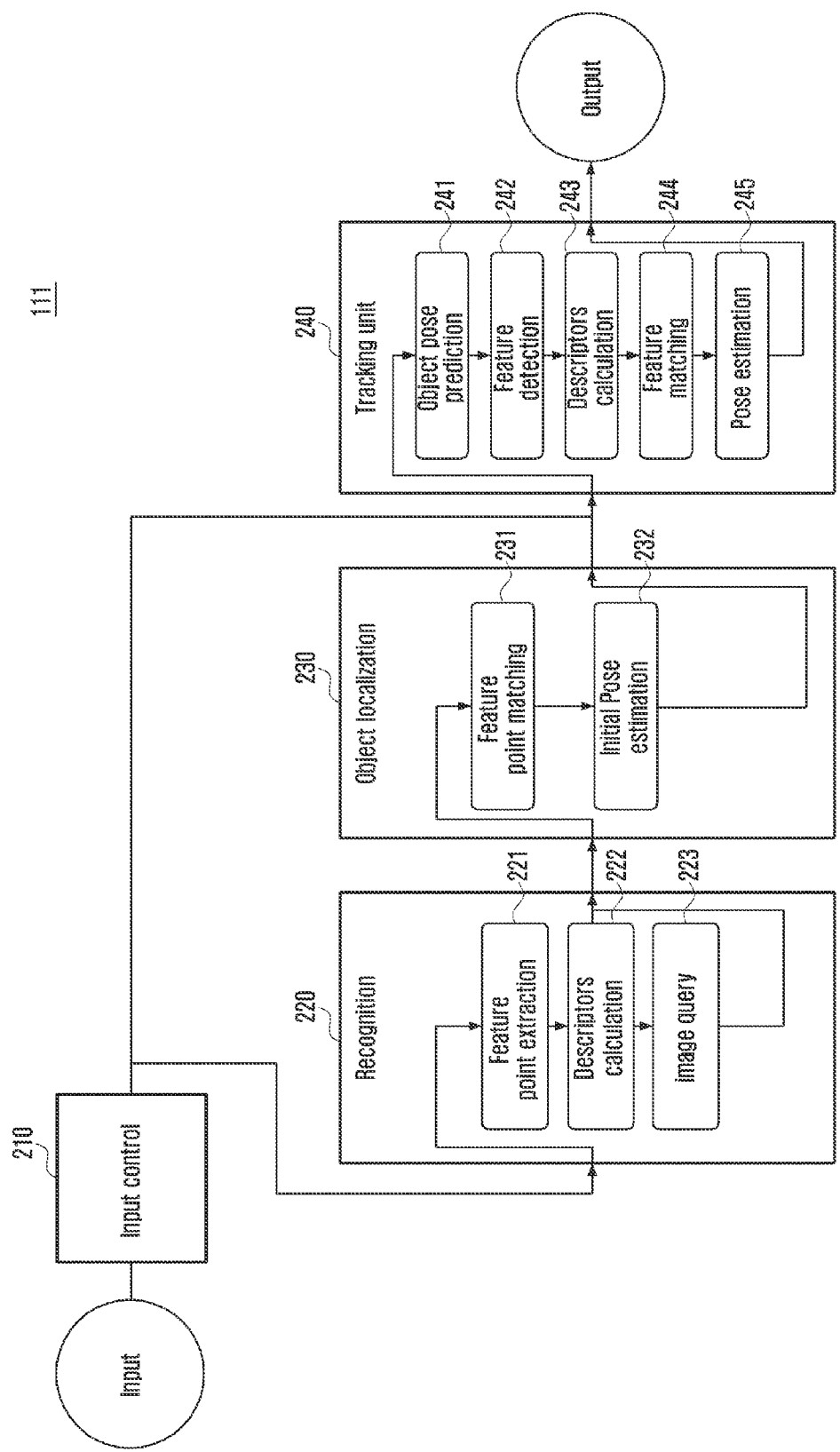
FIG. 2 is a block diagram illustrating a configuration of a main unit of FIG. 1 according to an embodiment of the present disclosure.

FIG. 2 is a block diagram illustrating a configuration of a main unit of FIG. 1 according to an embodiment of the present disclosure.

Referring to FIG. 2, an object processing unit 111 is implemented with at least one processor, e.g. an Application Processor (AP), which includes an input control unit 210, a recognition unit 220, an object localization unit 230, and a tracking unit 240.

The input control unit 210 may identify input data provided by the object processing unit 111. The input control unit 210 may determine a transfer route of the input data according to a current function execution state of the object processing unit 111. For example, if image information is acquired, the input control unit 210 may provide the recognition unit 220 with the image information. The image information may be acquired from the camera connected to, and/or embedded, in the object processing unit 111.

If the recognition unit 220 has recognized an image and then the object localization unit 230 has localized an object, the input control unit 21 sends the tracking unit 240 the image information directly. The input control unit 210 also may send the image information to the recognition unit 220 and the tracking unit 240 simultaneously. In this way, the recognition process and object tracking process that are performed according to the image information may be performed in parallel.

In a case where the tracking unit 240 is performing the object tracking function, the input control unit 210 may control such that the image information is not provided to the recognition unit 220. If the tracking unit 240 fails to track the object, the input control unit 210 may resume providing the recognition unit 220 with the image information. In a case where the AR content is applied to the tracking object, the input control unit 210 may provide the tracking unit 240 with other input information, such as audio information, sensor information, and any other suitable and/or similar information.

If the image information is received from the input control unit 210, the recognition unit 220 performs a recognition process on the image information. That is, the recognition unit 220 may include a feature point extraction module 221, a descriptors calculation module 222, and an image query module 223 to perform respective processes on the received image information.

The feature point extraction module 221 may execute a process of extracting feature points from the image. The feature point extraction module 221 may execute a binarization process. If the binarization process is performed, a color image may be converted to a black and white image. According to an embodiment of the present disclosure, the feature point extraction 221 may execute a barcode extraction process.

A descriptor may be information defining unique characteristics of the image obtained based on extracted feature point information. The descriptor may include at least one of positions of feature points, an arrangement pattern of the feature points, and unique characteristics of the feature points. That is, the descriptor may be a value simplifying the unique characteristics at certain points on the image. At least one descriptor may be extracted from the image information.

If the descriptor calculation module 222 has completed a descriptor calculation process, the recognition unit 220 performs a comparison with the reference object using the image query module 223. That is, the recognition unit 220, using the image query module 223, determines whether there is any descriptor matching any of calculated descriptors or any reference object having descriptors in a predetermined error range. The reference object may be provided from an internal memory configured to operate the object processing unit 111. The reference object may also be provided from an external storage device, e.g. an external server, for the operation of the object processing unit 111. The reference object may be the previously stored image information on a specific image. For example, a face recognition process may need an external reference face database for recognition of authenticated faces and may include differences among the faces. Meanwhile, the QR code is not needed to be updated dynamically. With respect to the QR code, a predetermined rule is needed for recognizing QR code. Accordingly, the QR code may have an internal reference object. The recognition unit 220 may simplify a calculation in the image recognition process using the reference object. The recognition unit 220 also may identify the target object using the reference object.

The object localization unit 230 identifies various objects constituting the image information. The object localization unit 230 includes a feature point matching module 231 and an initial pose estimation module 232. That is, the object localization unit 230 extracts the feature points of the object identified in the image information. The object localization unit 230, using the feature point matching unit 231, compares, or in other words matches, the feature points of the object with at least one of reference objects. If there is no match in feature points, the object localization unit 230 may update the matching information. Once the feature point matching unit 231 has completed matching the feature points, the object location unit 230, using the initial pose estimation unit 232, estimates an initial pose of at least one object included in the image information. If the object processing unit 111 activates the object tracking function, the object localization unit 230 provides the tracking unit 240 with the object information, including at least one of matching information and initial pose information.

The tracking unit 240 receives initial pose estimations of the recognized target objects from the object localization unit 230. The tracking unit 240 may continue tracking through repetitive pose calculations on the target object. The tracking unit 240 may include the recognition information included in the object pose information and basic output of the object localization information. Particularly, the tracking unit 240 according to the present disclosure may proceed to track objects by using key frames. At this time, the tracking unit 240 may support key frame selection, key frame management, and key frame operation when it fails in tracking the object. As illustrated in FIG. 2, the tracking unit 240 may include an object pose prediction unit 241, a feature detection unit 242, a descriptor calculation unit 243, a feature matching unit 244 and a pose estimation unit 245.

The object pose prediction unit 241 may predict a pose of at least one object included in image information. The object pose prediction unit 241 may receive an initial pose estimation value of at least one object included in the image information from the object localization unit 230. Accordingly, the object pose prediction unit 241 may predict the pose of the object according to movements of objects included in the image information, based on the initial pose estimation value of the objects. That is, the object pose prediction unit 241 may predict in which direction, position, and/or pose at least one object included in the image information moves, based on the initial pose estimation value.

More specifically, the object pose prediction unit 241 compares previously acquired image information with currently acquired image information, so as to calculate a degree of the movement of the whole image information, that is, at least one of a movement distance, a movement direction, and a movement pose. Further, the object pose prediction unit 241 may predict a movement of at least one object included in the image information, based on the calculated movement degree. For example, the object pose prediction unit 241 may perform phase correlation between the previous frame and the current frame. At this time, the object pose prediction unit 241 may perform the phase correlation by applying a Fast Fourier Transform (FFT) algorithm. Further, the object pose prediction unit 241 may predict the movement pose and movement distance of the object by applying various existing algorithms (for example, Pose from Orthography and Scaling with Iteration (POSIT)). The object pose prediction may be performed in real time.

When the prediction of the object movement is completed by the object pose prediction unit 241, the feature detection unit 242 may detect features of the currently acquired image information or features of the object. The same process as a feature detection performed by the recognition unit 220 may be applied to the detection of the features of the image information performed by the feature detection unit 242. Alternatively, the feature detection process performed by the feature detection unit 242 may be simpler than the feature detection process performed by the recognition unit 220. That is, the feature detection unit 242 may extract a relatively smaller number of features in comparison with the feature detection performed by the recognition unit 220, or may extract the features in a relatively narrower area in comparison with the feature detection performed by the recognition unit 220, in order to support the tracking of the movement of the object. For example, the feature detection unit 242 of the tracking unit 240 may detect only features of a particular object within a predetermined range area. At this time, the predetermined range area may be set in various levels.

Meanwhile, the feature detection unit 242 may select at least one of the previously stored key frames. Further, the feature detection unit 242 may calculate a parameter for matching the current image information and key frames. For example, the feature detection unit 242 may perform integral image processing to record feature location information in the image information. The integral image processing may be processing of defining a location value of each of the features from a reference point of the image information. Particularly, the image processing may define a location value of a particular feature included in the image information according to each of accumulated areas based on a particular edge point which can be defined as a predetermined point, for example, (0, 0) in a (x, y) coordinate. Accordingly, the calculation of the location value of the feature at the particular point may be performed by subtracting a location value of accumulated areas which do not include the corresponding point from the location value of the accumulated areas including the corresponding point. Meanwhile, the feature detection unit 242 may define feature location information in the image information by relation with other features adjacent to the feature.

The descriptor calculation unit 243 may calculate a descriptor based on a result of the feature detection. The descriptor calculation unit 243 may calculate the descriptor based on the features detected by the feature detection unit 242 of the tracking unit 240. The descriptor may be defined by predetermined areas or a number of areas arranged on the image information or features of areas included in at least one object. For example, the descriptor calculation unit 243 applied to the present disclosure may use a chain type pyramid Binary Robust Independent Elementary Feature (BRIEF) descriptor (hereinafter referred to as a chain type BRIEF descriptor or a descriptor).

The chain type BRIEF descriptor may rotate (x, y) pairs of features in the image information by the pre-calculated feature pose in order to acquire robustness of the rotation. Further, to provide robustness of blur processing for noise removal and high performance, the chain type BRIEF descriptor may use respective areas around pixels instead of smoothed intensities of the pixels. In addition, the chain type BRIEF descriptor may select a size of one side of a quadrangle in proportion to pre-calculated feature scale and re-calculate a set of (x, y) pairs in accordance with the scale to provide robustness of the scale. The descriptor calculation unit 243 may provide a corresponding result to the feature matching unit 244 when the descriptor calculation is completed.

The feature matching unit 244 may perform the feature matching based on the chain type BRIEF descriptor calculated by the descriptor calculation unit 243. That is, the feature matching unit 244 may search for a descriptor similar to the chain type BRIEF descriptor calculated from the key frame in the current image information and compare the chain type BRIEF descriptor and the found descriptor, so as to perform the matching between the descriptors. When a result of the comparison between the key frame and the current image information is smaller than a predefined value, for example, when the similarity is smaller than a predetermined value, the feature matching unit 244 may define the current image information as a new key frame candidate. Further, the feature matching unit 244 may make support such that the new key frame candidate is registered in the key frames according to a design scheme. At this time, the feature matching unit 244 may remove a previously registered key frame and register the new key frame candidate as the key frame. Alternatively, the feature matching unit 244 may make support such that the new key frame is registered without the removal of the previously registered key frame. Meanwhile, the feature matching unit 244 may perform matching between the current image information and features of at least some areas included in the key frame. Such a case corresponds to a case where the descriptor includes only one feature.

The pose estimation unit 245 may estimate degrees of a pose and a location generated by the object movement in the image information through the descriptor matching between the key frame and the current image information. That is, the pose estimation unit 245 may detect whether the movements of the objects included in the image information match predicted information. Here, the pose estimation unit 245 may identify a changed scale and direction of the object according to the object movement and perform a correction of the object according to the change. The pose estimation unit 245 collects a direction change and a scale change which should be expressed by the actual object movement in a state where the prediction matches the actual object movement.

Further, the pose estimation unit 245 may control to apply contents according to the direction change and the scale change to displaying of augmented reality contents to be applied to the corresponding object. That is, when the scale is reduced according to the movement of the object, the pose estimation unit 245 may change a size of the augmented reality contents to be displayed in accordance with the scale change and display the augmented reality contents of the changed size. Further, when the direction is changed according to the movement of the object, the pose estimation unit 245 may control a direction of the augmented reality contents to be displayed in accordance with the direction change of the corresponding actual object and display the augmented reality contents of the changed direction.

The tracking unit 240 may perform relocalization when failing in tracking the object. Through the relocalization, the tracking unit 240 may rapidly make up for the object tracking failure. When the object which is being tracked is not detected from the current image information, the tracking unit 240 may re-perform the object tracking based on at least one key frame among the key frames used for tracking the object in the corresponding image information. That is, the tracking unit 240 may extract objects from the currently collected image information and compare a descriptor defining features of the extracted objects with descriptors of the objects in the key frames. Further, the tracking unit 240 may select key frames having most similar descriptors and support the re-performance of the object tracking. The tracking unit 240 may compare similarity between the current image information and the key frame based on a descriptor including at least one feature. As a result, the tracking unit 240 may compare the current image information and at least some features of the key frame and select a key frame which is the most similar to the current image information based on the comparison. Further, the tracking unit 240 may make support such that objects included in the selected key frame are tracked for the current image information. To this end, the tracking unit 240 may include a separate component (for example, a relocalization unit) performing the localization.

The tracking unit 240 may preferentially perform a comparison between a key frame which is used just before the object tracking failure and the current image information. Further, when the similarity between the descriptors is equal to or larger than a predetermined value as a result of the corresponding comparison, the tracking unit 240 may support the performance of the object tracking function based on the corresponding key frame without selection and comparison of other key frames. Alternatively, the tracking unit 240 may register previous image information to which the key frame has been applied just before the current image information collection as a new key frame, compare descriptors of the newly registered key frame and the current image information, and make a request for performing the tracking function according to a result of the comparison.

Through such a process, the tracking unit 240 according to the present disclosure may recover the object tracking failure with a higher probability through the relocalization without re-performance of the object recognition and localization processes when the object tracking is failed. As a result, the tracking unit 240 according to the present disclosure may support more rapid object tracking performance by reducing time and calculation spent for the object recognition and localization processes through the relocalization.

Figure 3:
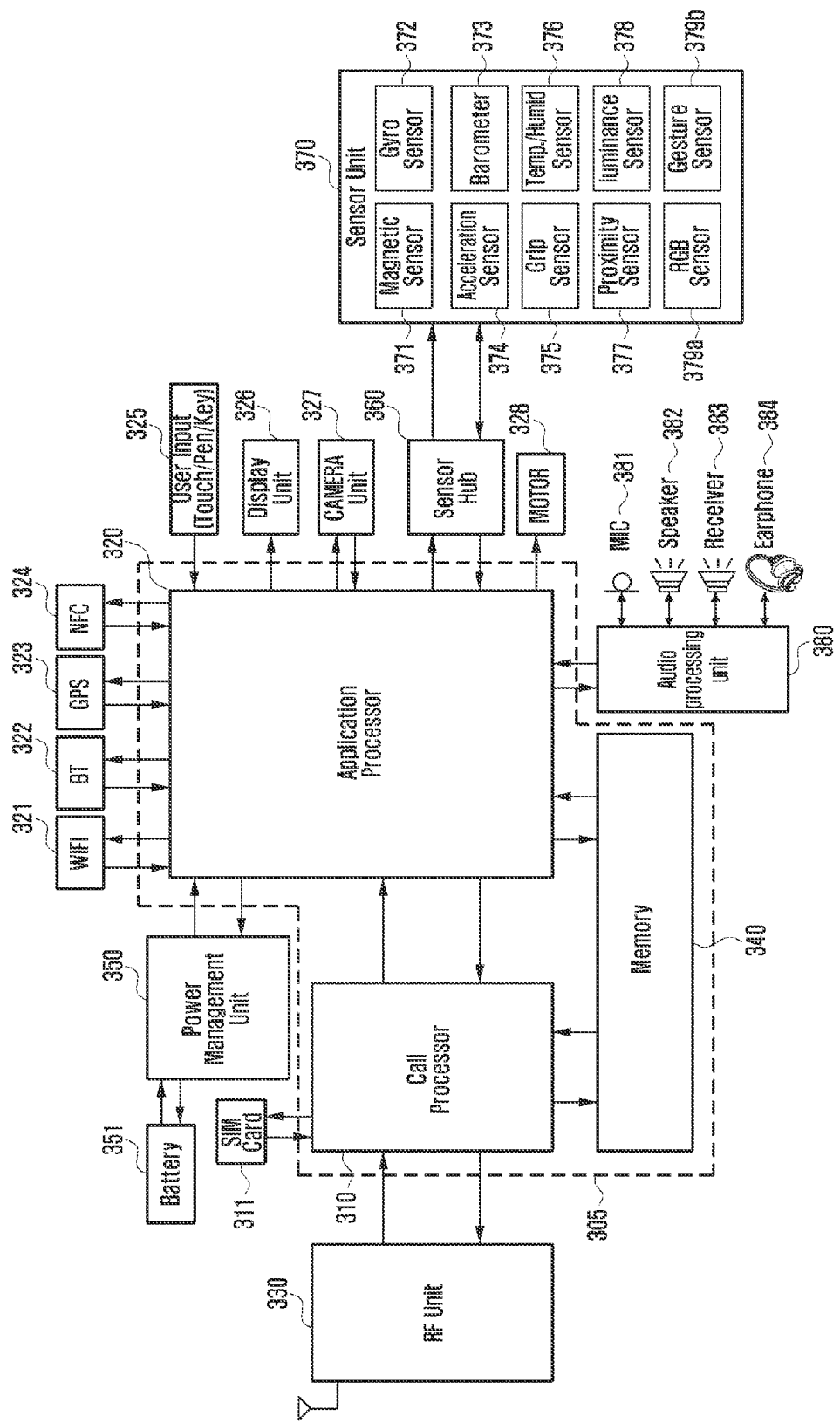
FIG. 3 is a block diagram illustrating a configuration of a terminal equipped with an object tracking function according to an embodiment of the present disclosure.

FIG. 3 is a block diagram illustrating a configuration of a terminal equipped with an object tracking function according to an embodiment of the present disclosure.

Referring to FIG. 3, a terminal 300 may be an exemplary electronic device equipped with the above-described main unit, and the terminal 300 may include a control unit 305 which controls overall operations of the terminal 300, signal flows among the components of the terminal 300, data processing function execution, and power supply from a battery 351 to the components. The control unit 305 includes a call processor 310, an AP 320, and a memory 340.

The call processor 310 communicates signals with a Radio Frequency (RF) unit 330, the memory 340, and a Subscriber Identity Module (SIM) card 311. The call processor 310 communicates with the AP 320 to support processing tasks needing access to the RF unit 330, the memory 340, and the SIM card 311 from among the functions processed by the AP 320.

The AP 320 may operate as the above-described object processing unit 111 and/or as a processor of the client 110. The AP 320 also may include at least one CPU. The AP 320 also may include at least one GPU.

The AP 320 receives the power from a power management unit 350 connected to the battery 351. The AP 320 communicates signals with various communication units, including a Wi-Fi unit 321, a Bluetooth (BT) unit 322, a GPS unit 323, and a Near Field Communication (NFC) unit 324 and supports the operations of the communication units.

The AP 320 may connect to a user input unit 325, which may include a touch panel (not shown) and a key input unit (not shown). Here, the touch panel may include a touchscreen (not shown) included in a display unit 326. The touch panel communicates a touch event to the AP 320 in response to a touch gesture made on the screen with a touch input tool, e.g. a finger and a pen. The key input unit may include a touch key (not shown). The touch key may be implemented in a capacitance type or resistance type to detect the touch gesture of the user. The touch keys may communicate a signal to the AP 320 in response to the touch gesture of the user. The key input unit may include another type of key (not shown), e.g. a dome key, in addition to the touch key.

The AP 320 may communicate signals with the memory 340. Here, the memory 340 may include a main memory unit and a secondary memory unit. The secondary memory unit may store a booting program, at least one Operating System (OS), and applications. The main memory loads various program, such as booting program, an OS, and applications from the secondary memory. If the battery 351 supplies power, the AP 320 loads the booting program on a main memory (not shown). The booting program loads the OS on the main memory. The OS loads the applications on the memory 340. The AP 320 accesses the programs to interpret the program commands and execute a function, e.g. object recognition, object localization, and object tracking, corresponding to the command.

The AP 320 may be connected with the display unit 326, a camera 327, a motor 328 which may provide a vibration function, and an audio processing unit 380.

The display unit 326 displays video data on the screen under the control of the control unit 305, particularly the AP 320. That is, the control unit 305 processes data, e.g. decodes the data, and buffers the processed data in a buffer, and the display unit 326 converts the buffered data to an analog signal to be displayed on the screen. If the display unit 326 powers on, the display unit 326 displays a home image instead of a lock image under the control of the control unit 305. The home image may include a background image, e.g. a picture configured by the user, and a plurality of icons presented thereon. Here, the plurality of icons represent corresponding applications and/or contents, e.g. photo files, video files, audio files, documents, messages, etc. If a touch gesture is made to an icon, e.g., an object tracking application icon, using a touch input tool, the control unit 305 drives the camera 327 and executes the object tracking application using the image input through the camera 327. The display unit 326 may receive the image in accordance with the execution of the object tracking application, e.g. as a preview image and object tracking information, and converts the image into the analog signal to be displayed on the screen.

The camera 327 takes a picture and outputs the picture to the AP 320. The camera 327 includes a lens for gathering light, an image sensor to convert the light into an electric signal, an Image Signal Processor (ISP) to process the electric signal to generate a frame, which may include raw data, such as raw picture data, raw image data, and/or raw photograph data. The ISP resizes the frame to a size corresponding to a size of the screen. The ISP outputs the preview image to the AP 320. The AP 320 controls the display unit 326 to display the preview image on the screen. The image resizing may be performed by the AP 320. For example, the frame is transferred to the buffer of the AP 320 which processes the frame to generate the preview image to be displayed on the display unit 326.

The audio processing unit 380 may include a microphone 381, a speaker 382, a receiver 383, and an earphone connection device 384. The AP 320 may connect to a sensor hub 360. The sensor hub 360 connects to a sensor unit 370 including various sensors. The sensor unit 370 may include at least one of a magnetic sensor 371, a gyro sensor 372, a barometer 373, an acceleration sensor 374, a grip sensor 375, a temperature and/or humidity sensor 376, a proximity sensor 377, a luminance sensor 378, a Red Green Blue (RGB) sensor 379*a*, and a gesture sensor 379*b*.

Figure 4:
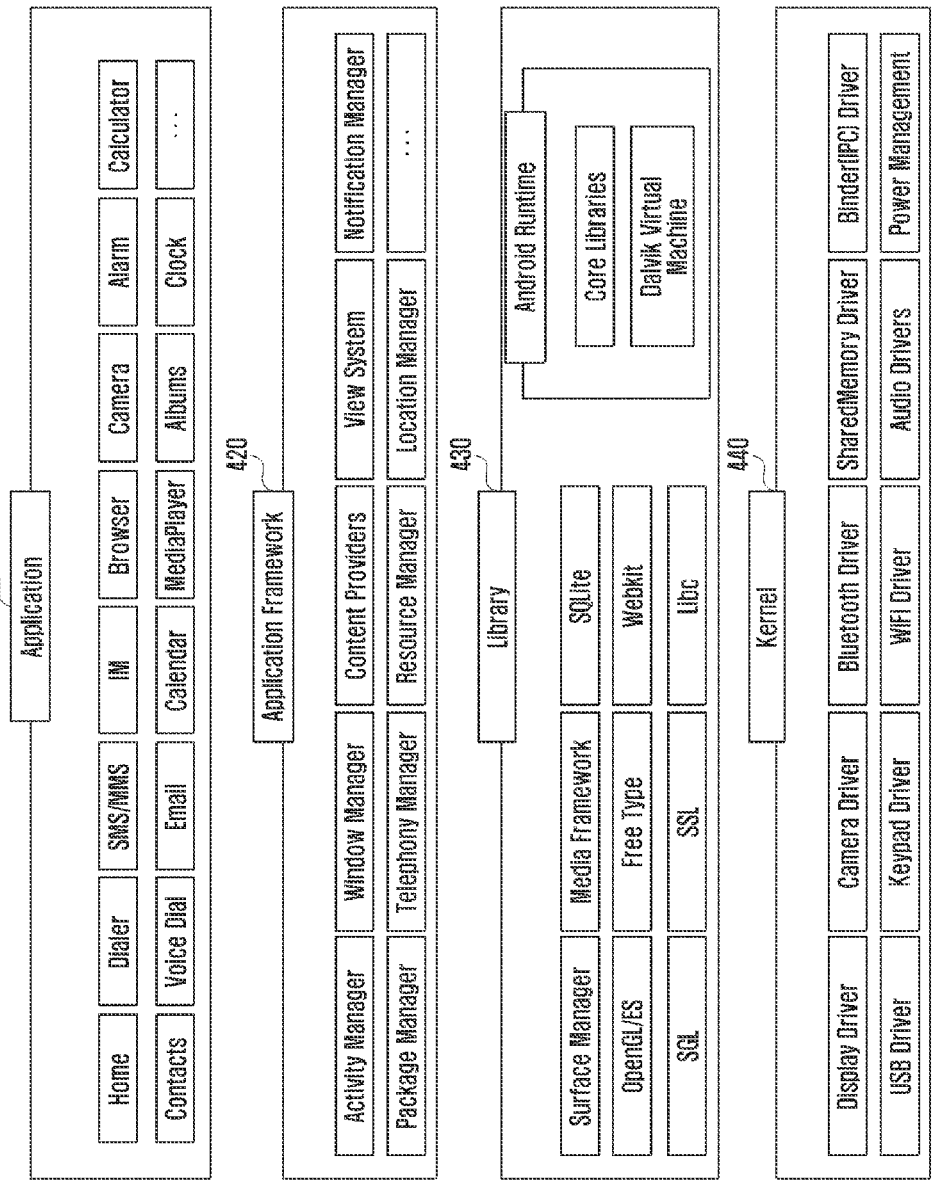
FIG. 4 is a diagram illustrating a platform for an object tracking function according to an embodiment of the present disclosure.

FIG. 4 is a diagram illustrating a platform for an object tracking function according to an embodiment of the present disclosure.

Referring to FIG. 4, an object tracking function-enabled platform includes an application layer 410, an application framework layer 420, a library layer 430, and a kernel layer 440.

The kernel layer 440 may include a Linux kernel. The kernel layer 440 may include a display driver, a camera driver, a Bluetooth (BT) driver, a shared memory driver, a Binder driver, a Universal Serial Bus (USB) driver, a keypad driver, a Wi-Fi driver, an audio driver, a power management unit, and any other similar and/or suitable driver and/or unit.

The library layer 430 includes a surface manager, a media framework, SQLite, OpenGL/ES, FreeType, Webkit, SGL, SSL, Libc, etc. The library layer 430 may include an Android runtime component. The Android runtime component may include a core library and a Dalvik Virtual Machine. The Dalvik Virtual Machine enables the object tracking function-enabled terminal to support a widget function and a function needing real time execution and periodic execution according to a preconfigured schedule.

The application framework layer 420 includes an activity manager, a window manager, a content provider, a view system, a notification manager, a package manager, a telephony manager, a resource manager, a location manager, etc. The application layer 410 includes a home application, which may also be referred to as an App, a dialer application, a Short Messaging Service/Multimedia Messaging Service (SMS/MMS) application, an Instant Messenger (IM) application, a camera application, an alarm application, a calculation application, a content application, a voice dial application, an email application, a calendar application, a media player application, an album application, a clock application, etc.

The object tracking function of the present disclosure is described hereinafter in detail with reference to FIGS. 5 to 11.

Figure 5:
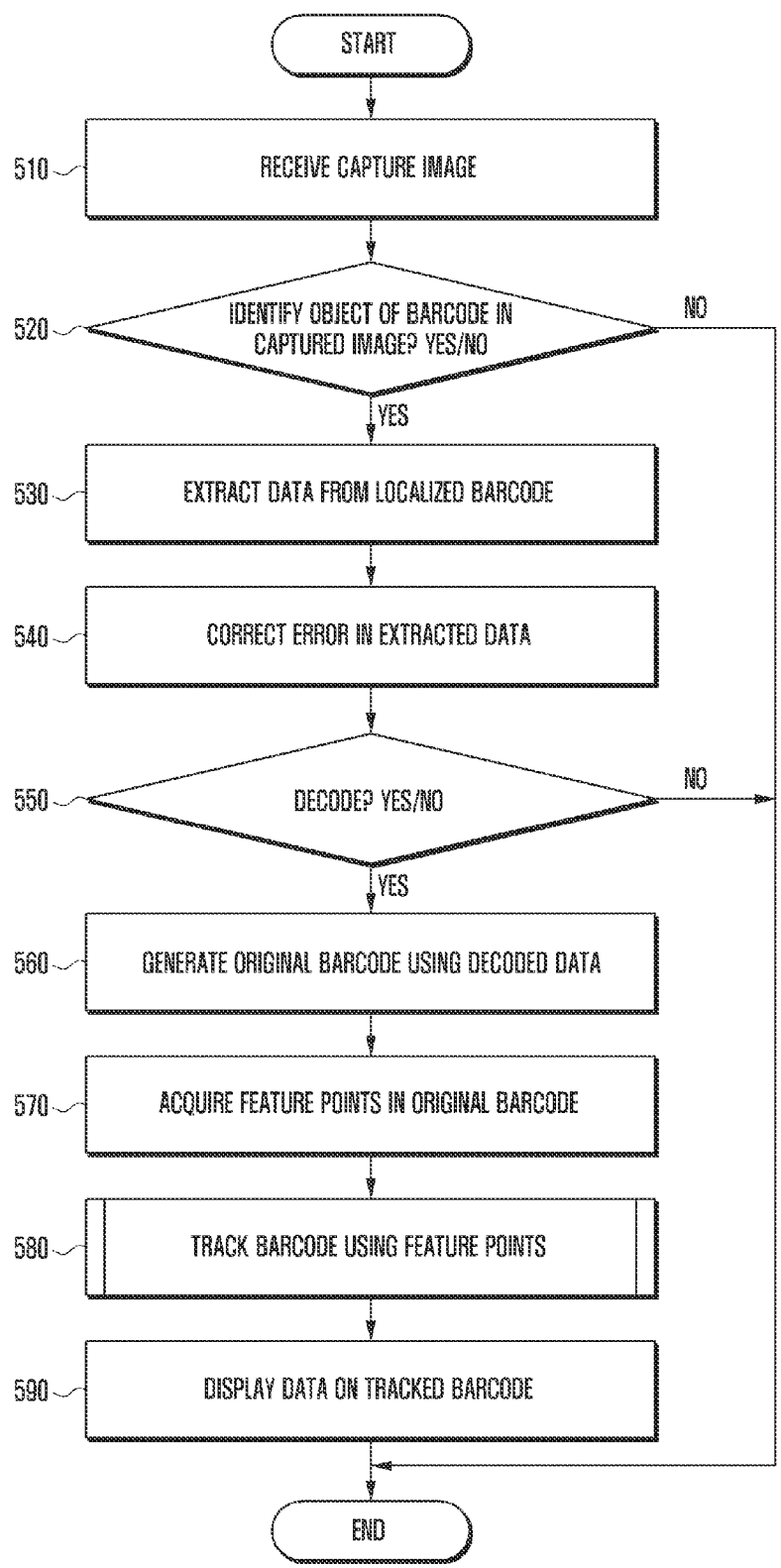
FIG. 5 is a flowchart illustrating an object tracking method according to an embodiment of the disclosure.
Figure 6:
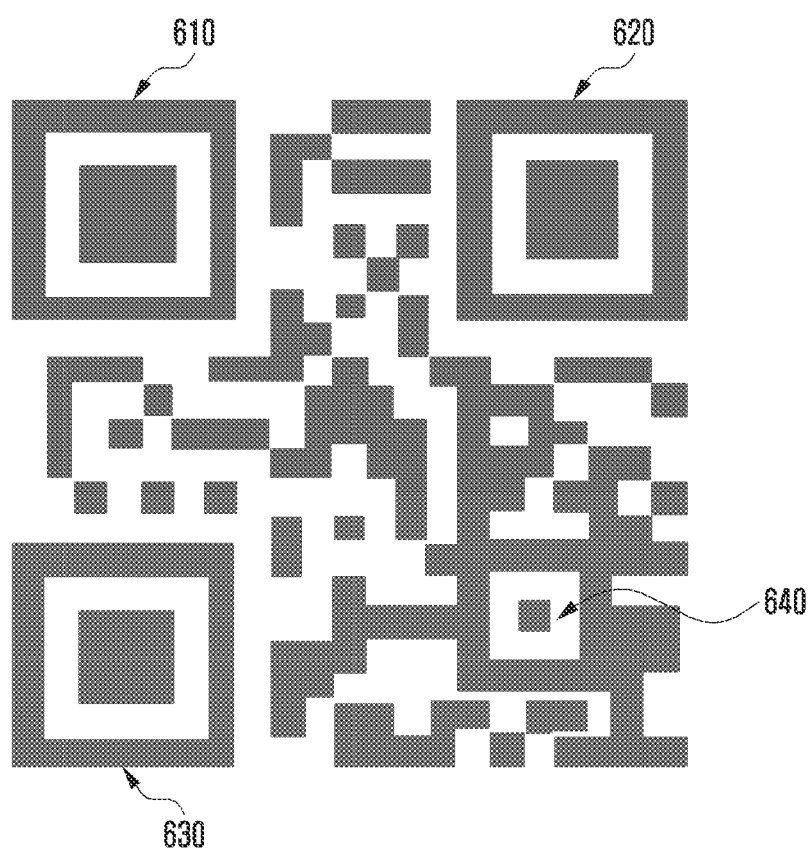
FIG. 6 is a diagram illustrating an original image of QR code for use in explaining an object tracking method according to an embodiment of the present disclosure.
Figure 7:
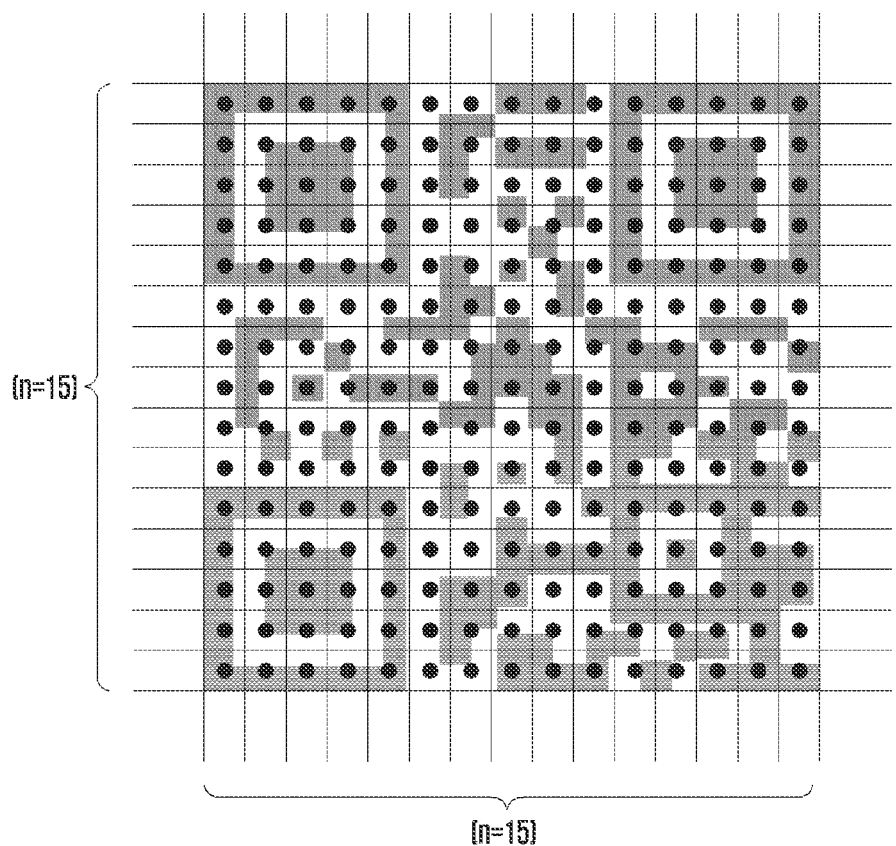
FIG. 7 is a diagram illustrating an enlarged image of a QR code of FIG. 6 according to an embodiment of the present disclosure.
Figure 8A:
FIG. 8A is a perspective view of a mobile terminal with a screen displaying a preview image of a QR code for use in explaining an object tracking method according to an embodiment of the present disclosure.
Figure 8B:
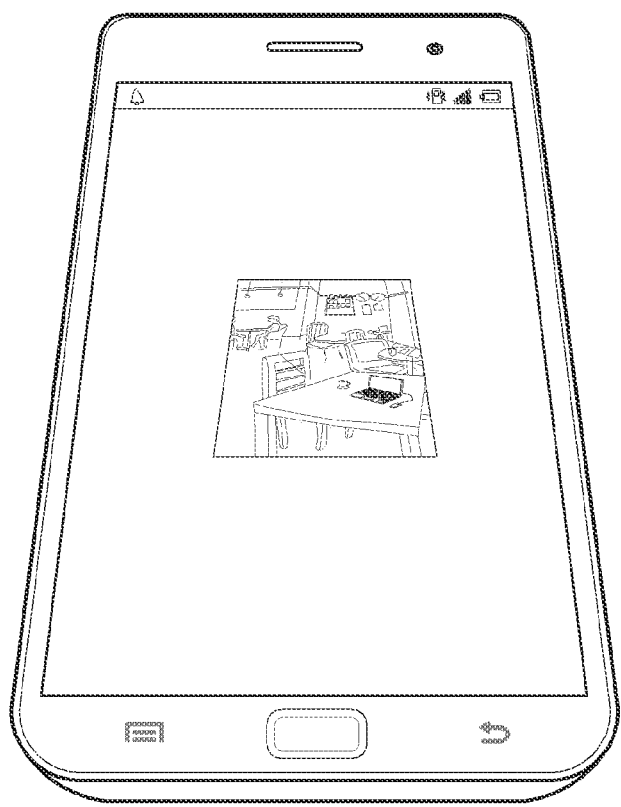
FIG. 8B is a diagram illustrating a 'related data' presented on a QR code of FIG. 8A according to an embodiment of the present disclosure.

FIG. 5 is a flowchart illustrating an object tracking method according to an embodiment of the disclosure. FIG. 6 is a diagram illustrating an original image of a QR code for use in explaining an object tracking method according to an embodiment of the present disclosure. FIG. 7 is a diagram illustrating an enlarged image of a QR code of FIG. 6. FIG. 8A is a perspective view of a mobile terminal with a screen displaying a preview image of a QR code for use in explaining an object tracking method according to an embodiment of the present disclosure, and FIG. 8B is a diagram illustrating a 'related data' presented on a QR code of FIG. 8A according to an embodiment of the disclosure.

Referring to FIGS. 3, 5, and 6, the control unit 305, particularly the AP 320, receives a request for executing an object tracking application. In response to the request, the control unit 305 loads the object tracking application from a secondary memory to a main memory to perform a process corresponding to the object tracking application. The control unit 305 drives the camera 327 in response to the process and receives a capture image from the camera 327 at operation 510. The control unit 305 also may receive the capture image from an external device using a radio communication unit, e.g. the Wi-Fi unit 321, the Bluetooth unit 322, the NFC unit 324, and the RF unit 330.

The control unit 305 determines whether it is possible to localize a barcode in the capture image, or in other words, the control unit 305 determines whether an object of the barcode may be identified in the captured image at operation 520. Various object localization methods may be applied at operation 520. For example, a finder pattern-based object localization method may be used as follows. The control unit 305 first extracts the candidates that may be used as a finder pattern in the capture image. Here, the finder pattern is a symbol for locating a position of the barcode in the capture image. In an exemplary case of QR code in a shape of a square, the finder pattern may be arranged at each of the three of four corners of the square. Accordingly, if such finder patterns are detected so to be candidates, a region of the QR code is determined for extracting data therefrom.

The control unit 305 extracts contours of the candidates. If a size of a contour, e.g., a value of width, height, or size, of a candidate is less than a first value selected by the control unit 305, the candidate may be removed from a list of the candidates. If a contour of a candidate is greater than a second value selected by the control unit 305, the candidate of may be removed from the list. The control unit 350 determines the finder patterns from among the candidates using the contours of the candidates. Next, the control unit 305 determines a version and a size of the barcode using the finder patterns. The control unit 305 may localize the barcode in the capture image using size information and position information, e.g. angular points and/or any other similar and/or suitable size information and/or position information, of the finder pattern. The control unit 305 may predict a camera pose, e.g. a viewing angle of a camera, using the finder patterns of the localized barcode. The camera post prediction is described later with reference to FIG. 12.

The control unit 305 extracts data from the localized barcode at operation 530. In detail, the control unit 305 performs warping on the localized barcode, which has been localized, i.e. separated, from the capture image to recover an original shape of the barcode. The warping process may include a compensation process to compensate coordinates of the barcode. The compensation process may be referred to as a homography calculation. The control unit 305 also may extract data from the warped barcode. In order to enhance an accuracy of object localization and recovery, the control unit 305 may detect an alignment pattern 640 of the barcode using a determined version and size. If the alignment pattern 640 is detected, the control unit 305 may localize the barcode in the capture image using the alignment pattern 640.

The data extracted at operation 530 may be encoded data. Here, the encoded data may be referred to as encrypted data. The control unit 305 may perform error correction on the encrypted data, in order to correct an error in the extracted code, at operation 540. In the case of QR code, an error correction method and rule for the error correction on the encrypted data are specified in ISO/IEC 18004:2006.

The control unit 305 determines whether to perform decoding on the error-corrected result to generate decoded data at operation 550. In the case of QR code, the control unit 305 decodes the encrypted data according to a decoding rule specified in International Organization for Standardization/ International Electrotechnical Commission (ISO/IEC) 18004:2006. If data matching the decoded data is found in a reference DB, e.g. the local reference DB 115 and/or the remote reference DB 121, the control unit 305 determines the decoded data as meaningful data. That is, if the data matching the decoded data is retrieved from the reference DB, the control unit 305 determines that the data decoding is successful.

If the decoding is successful, the control unit 305 recovers, or in other words generates, an original barcode using the decoded data at operation 560. In a case of QR code, the original barcode may be an image as shown in FIG. 6, including finder patterns 610, 620, and 630, and an alignment pattern 640.

The control unit 305 acquires the feature points from the original barcode at operation 570. Particularly, the control unit 305 enlarges a size of the original barcode and acquires the feature points from the enlarged original barcode.

The feature points acquisition may be performed as follows. The control unit 305 enlarges the original barcode m-fold, or in other words, enlarges the original barcode m-times. For example, one pixel is multiplied into m*m pixels. Here, m is a positive integer which is determined according to the type and size, e.g. an area, of the original barcode. In a case where the original barcode is a QR code, the control unit 305 may set m to 4. The enlarged original barcode may be used as an original QR code for extracting the QR code. That is, the control unit 305 may use the enlarged original barcode as a reference for tracking the barcode.

Next, the control unit 305 splits the enlarged original barcode into grid sections. Here, the grid consists of n*n pixel regions, and each of the n*n pixel regions may be referred to as a patch. Here, a value of n is determined according to the type and size, e.g. the area, of the original. In a case of a QR code, the control unit may set n to 15, as shown in FIG. 7. The control unit 305 may select feature points from among center points of patches. For example, the control unit 304 calculates scores of respective individual center points. Various score calculation methods may be used to calculate the scores of the respective individual center points. For example, a Shi-Tomashi algorithm may be used as a score calculation method in the present disclosure. However, the present disclosure isn't limited thereto, and any similar and/or suitable score calculation method may be used. The control unit 305 may determine which of the respective individual center points correspond to the scores greater than a predetermined threshold value as the feature points of the original. Also, the control unit 305 may select all center points as feature points regardless of the score calculation.

The control unit 305 tracks the barcode using the feature points of the reference barcode, which is the enlarged original barcode, at operation 580. That is, the control unit 305 tracks the changes of the feature points. The feature points-based barcode tracking method is described in detail later with reference to FIGS. 9 and 10.

The control unit 305 controls the display unit 326 to display data which is related to the barcode, e.g. the decoded data, a part of decoded data, and data related to the decoded data, on the tracked barcode. For example, the QR code as shown in FIG. 8A is tracked, and the image as shown in FIG. 8B is presented on the QR code.

Figure 10:
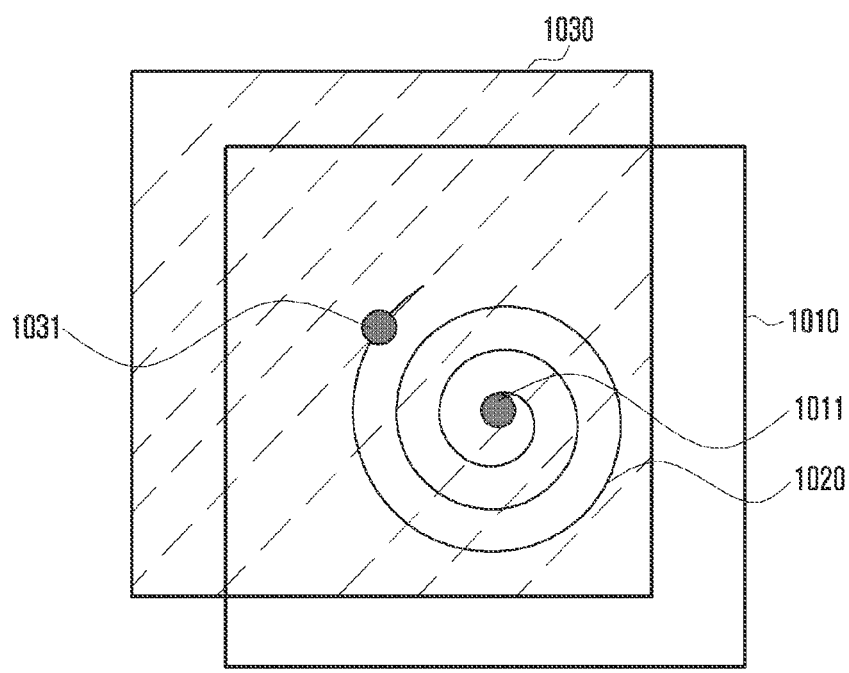
FIG. 10 is a diagram illustrating a principle of finding a matching patch in a capture image by navigating patches along a spiral trajectory.

FIG. 9 is a flowchart illustrating a feature points-based barcode tracking procedure of an object tracking method according to an embodiment of the present disclosure. FIG. 10 is a diagram illustrating a principle of finding a matching patch in a capture image by navigating patches along a spiral trajectory according to an embodiment of the present disclosure.

Referring to FIG. 9, the control unit 305 receives a capture image from the camera 327 or from an external device via the radio communication unit at operation 910.

The control unit 305 projects feature points of the reference barcode, e.g. the enlarged original barcode, onto the capture image, using the homography of the barcode acquired from a camera pose prediction, at operation 920. Here, the camera pose prediction may include detailed information on previous frames, e.g. the capture image received at operation 510. The camera pose prediction also may be acquired using a motion model and/or a rough calculation.

The control unit 305 modifies the patches of the reference barcode that correspond to respective projected feature points to match the barcode of the capture image at operation 930. For example, the control unit 305 warps patches corresponding to respective projected feature points so as to match the barcode at operation 930. In warping process, an inverted homography of the acquired barcode acquired through camera pose prediction may be used.

Referring to FIG. 10, a warped patch 1010 is a patch of the warped reference, and a feature point 1011 is a center point of the patch. While a patch projection process is progressing, an anti-aliasing, e.g. a bilinear interpolation, a bicubic interpolation, a Multi-Sample Anti-Aliasing (MSAA), a Fast Approximate Anti-Aliasing (FXAA), etc. is used.

The control unit 305 searches the captured image for the patches corresponding to the warped patches at operation 940. For example, the control unit 305 moves the warped patch 1010 along a predetermined spiral trajectory 1020 from the feature point 1011. While the warped patch 1010 moves along the spiral trajectory 1020, the control unit 305 calculates a correlation between the warped patch 1010 and a captured image region 1030. Here, the correlation may be calculated using any of a Normalized Cross Correlation method, a Sum of Square Distances method, and their equivalents. While the warped patch 1010 moves along the spiral trajectory 1020, the captured image region 1030 having the highest correlation with the patch 1010 is determined as the patch corresponding to the warped patch 1010, i.e. the most similar patch. Also, a center point 1031 of the captured image region 1030 is determined as the new feature point. That is, the feature point 1011 is updated as the center point 1031, which may also be referred to as an updated feature point 1031.

The control unit 305 estimates, and/or calculates, the updated camera pose based on the search result, i.e. the updated feature point 1031, at operation 950. Here, the calculation method, such as an M-estimator and a robust hypothesize-to-verify method, e.g. Random Sample Consensus (RANSAC), Progressive Sampling Consensus (PROSAC), etc., may be used. When calculating, and/or estimating, the updated camera pose, the control unit 305 may use a value indicating a distance between the center point 1011 of the patch 1010 and the center point 1031 of the patch 1030.

Figure 11:
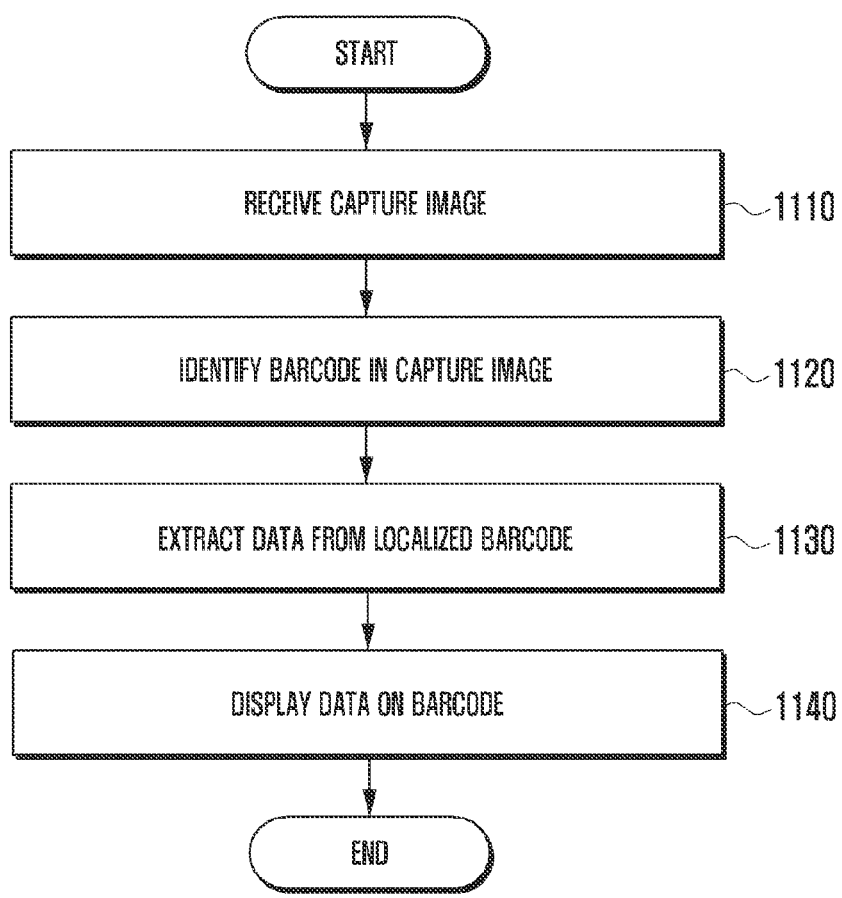
FIG. 11 is a flowchart illustrating a barcode-related data display procedure of an object tracking method according to an embodiment of the present disclosure.

FIG. 11 is a flowchart illustrating a barcode-related data display procedure of an object tracking method according to an embodiment of the present disclosure.

Referring to FIG. 11, detailed descriptions of parts of FIG. 11 that are similar to those described above are omitted herein. Referring to FIG. 11, the control unit 305 receives a capture image from the camera 327 or through the radio communication unit at operation 1110. The control unit 305 localizes a barcode as an object in the capture image, or in other words, the control unit 305 identifies a barcode in the capture image, at operation 1120. The control unit 305 extracts data from the localized barcode at operation 1130. The control unit 305 controls the display unit 326 to display at least one of the extracted data, a part of the extracted data, and related data on the localized barcode at operation 1140.

Figure 12:
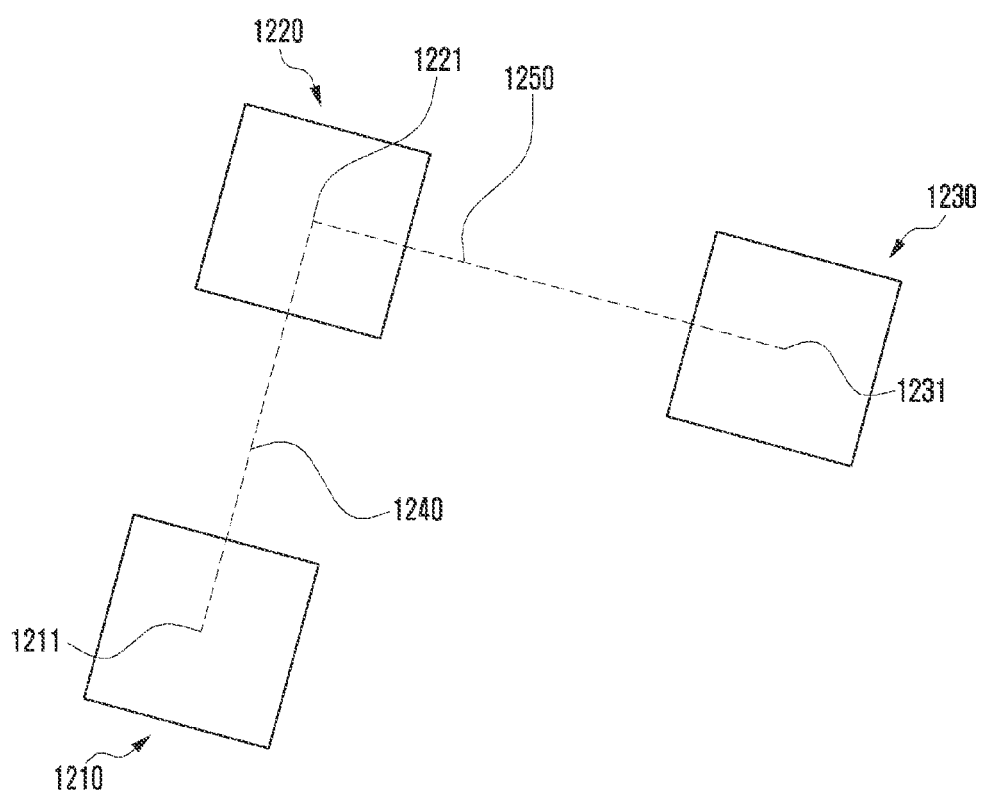
FIG. 12 is a diagram illustrating a principle of detecting finder patterns of a QR code as an object for use in an object tracking method according to an embodiment of the present disclosure.

FIG. 12 is a diagram illustrating a principle of detecting finder patterns of a QR code as an object for use in an object tracking method according to an embodiment of the present disclosure.

Referring to FIG. 12, finder patterns 1210, 1220, and 1230 are finder patterns of a QR code detected in a capture image. The control unit 305 calculates a first length of a first segment 1240 connecting a first center point 1211 and a second center point 1221. The control unit 305 calculates a second length of a second segment 1250 connecting the second center point 1221 and a third center point 1231. Here, a length is expressed in a unit of a pixel, a block, and/or any other similar and/or suitable unit of reference. Next, the control unit 305 calculates a ratio L corresponding to a camera pose, wherein the ratio L may be first length/second length or second length/first length. For example, the viewing angle of the camera to the subject, i.e. the barcode is preferred to be a rectangular angle, such as 90 degrees, the ratio L may be "1". As the viewing angle of the camera to the subject tilts, the ratio L increases or decreases accordingly.

In accordance with an embodiment of the present disclosure, a method for operating an electronic device includes tracking an object recognized from among a plurality of digital images, wherein the tracking of the object includes generating a reference object using at least a part of the recognized object that is recognized in at least one of the digital images and tracking the recognized object using the reference object. The generating of the reference object includes correcting an error included in the recognized object. The generating of the reference object includes determining whether the error of the recognized object is corrected successfully. The recognized object includes a barcode, and the generating of the reference object includes extracting data from the barcode and correcting any error included in the extracted data. The generating of the reference object includes decoding the extracted data in which the error is corrected. The recognized object includes a barcode, and the tracking of the recognized object includes acquiring feature points from the reference object and tracking the barcode in the plurality of digital images using the feature points.

In accordance with another embodiment of the present disclosure, a method for operating an electronic device includes localizing a barcode as an object in a captured image, extracting data from the barcode, generating an original of the barcode using the data, acquiring feature points from the original, and tracking the barcode using the feature points. The tracking of the barcode includes projecting the feature points of the original on a newly captured image, warping patches constituting the original that correspond to the projected feature points to match the barcode, searching the newly captured image for searched patches corresponding to the warped patches, and estimating a pose of the electronic device based on a search result. The estimating of the pose of the electronic device includes estimating the pose of the electronic device using values indicating distances between the warped patches and the searched patches. The distances are distances between center points of the warped patches and center points of the searched patches. The searching of the newly captured image includes searching the newly captured image for the searched patches by moving the warped patches along a trajectory selected by the electronic device from respective projected feature points. The trajectory is a spiral trajectory. The method further includes presenting at least one of the data, a part of the data, and information related to the data on the barcode. The acquiring of the feature points includes enlarging the original in size, splitting the enlarged original into patches of a grid, and acquiring the feature points from respective patches of the grid.

In accordance with another embodiment of the present disclosure, a method of operating an electronic device includes receiving a captured image, localizing a barcode as an object from the captured image, extracting data from the barcode, and displaying at least one of the data, a part of the data, and information related to the data on the barcode.

In accordance with another embodiment of the present disclosure, an electronic device includes a memory which stores at least one digital image and a processor which tracks an object recognized from among the at least one digital image, wherein the processor generates a reference object using at least a part of the object recognized from the at least one of the digital images for tracking and tracks the recognized object using the reference object. The processor corrects an error included in the recognized object. The processor determines whether the error of the recognized object is corrected successfully. The recognized object includes a barcode, and the processor extracts data from the barcode and corrects any error included in the extracted data. The processor decodes the data in which the error is corrected. The recognized object includes a barcode, and the processor acquires feature points from the reference object and tracks the barcode in the plural images using the feature points.

In accordance with another aspect of the present disclosure, an electronic device includes a camera which captures an image and a control unit which detects a barcode from the captured image and tracks the barcode, wherein the control unit localizes the barcode as an object in the captured image, extracts data from the barcode, generates an original of the barcode using the data, acquires feature points from the original, and tracks the barcode using the feature points. The control unit projects the feature points of the original on a newly captured image, warps patches constituting the original that correspond to the projected feature points to match the barcode, searches the newly captured image for searched patches corresponding to the warped patches, and estimates a pose of the electronic device based on a search result. The control unit estimates the pose of the electronic device using values indicating distances between the warped patches and the searched patches. The distances are the distances between center points of the warped patches and center points of the searched patches. The control unit searches the newly captured image for the searched patches by moving the warped patches along a trajectory selected by the electronic device from the respective projected feature points. The trajectory is a spiral trajectory. The control unit controls a display unit to display at least one of the data, a part of the data, and information related to the data on the barcode. The control unit enlarges the original in size, splits the enlarged original into respective patches of a grid, and acquires the feature points from the respective patches.

In accordance with still another embodiment of the present disclosure, an electronic device includes a camera which captures an image, a display unit which displays the captured image, and a control unit which extracts a barcode from the captured image and tracks the barcode, wherein the control unit localizes a barcode as an object from the captured image, extracts data from the barcode, and controls the display unit to display at least one of the data, a part of the data, and information related to the data on the barcode.

As described above, an object tracking method and apparatus of the present disclosure may locate a position of a barcode in an environment including various obstacle elements, such as camera motion, errors included in the captured image and motion blur.

The above-described object tracking method and apparatus of a portable device according to an embodiment of the present disclosure may be implemented in a form of computer-executable program commands and may be stored in a computer-readable storage medium. The computer readable storage medium may store the program commands, data files, and data structures in individual and/or combined forms. The program commands recorded in the storage medium may be designed and implemented for an embodiment of the present disclosure and/or used by those skilled in the computer software field. The computer-readable storage medium includes magnetic media such as a floppy disk and a magnetic tape, optical media including a Compact Disc (CD) Read Only Memory (ROM) and a Digital Video Disc (DVD) ROM, a magneto-optical media such as a floptical disk, and a hardware device designed for storing and executing program commands such as a ROM, a Random Access Memory (RAM), and a flash memory. The program commands include a language code executable by computers using an interpreter as well as machine language codes created by a compiler. The hardware device may be implemented with one or more software modules for executing operations of an embodiment of the present disclosure.

An object tracking method and apparatus of the present disclosure may be implemented with various modifications without departing from the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   receiving a captured image from a camera;
   recognizing an object in the captured image;
   generating a reference object by correcting an error included in the recognized object; and
   tracking the object using the generated reference object.

2. The method of claim 1, wherein the generating of the reference object comprises determining whether the error of the object is corrected successfully.

3. The method of claim 1, wherein the object comprises a barcode, and the generating of the reference object comprises:
   extracting data from the barcode; and
   correcting any error included in the extracted data.

4. The method of claim 3, wherein the generating of the reference object comprises decoding the extracted data in which the error is corrected.

5. The method of claim 1, wherein the object comprises a barcode, and the tracking of the object comprises:
   acquiring feature points from the generated reference object; and
   tracking the barcode in the at least one digital image using the feature points.

6. A method for operating an electronic device, the method comprising:
   localizing a barcode as an object in a captured image;
   extracting data from the barcode;
   generating an original of the barcode using the extracted data;

acquiring feature points from the generated original of the barcode; and tracking the barcode using the feature points.

7. The method of claim 6, wherein the tracking of the barcode comprises:

projecting the feature points on a newly captured image;

warping patches that constitute the original of the barcode and that correspond to the projected feature points in order to match the barcode;

searching the newly captured image for searched patches corresponding to the warped patches; and estimating a pose of the electronic device based on a search result.

8. The method of claim 7, wherein the estimating of the pose of the electronic device comprises estimating the pose of the electronic device using values indicating distances between the warped patches and the searched patches.

9. The method of claim 8, wherein the distances between the warped patches and the searched patches correspond to distances between center points of the warped patches and center points of the searched patches.

10. The method of claim 7, wherein the searching of the newly captured image comprises searching the newly captured image for the searched patches by moving the warped patches along a trajectory selected by the electronic device, and wherein the selected trajectory corresponds to the projected feature points.

11. The method of claim 10, wherein the trajectory is a spiral trajectory.

12. The method of claim 6, further comprising presenting at least one of the data, a part of the data, and information related to the data, on the barcode.

13. The method of claim 6, wherein the acquiring of the feature points comprises:

enlarging the original in size;

splitting the enlarged original into respective patches of a grid; and acquiring the feature points from the respective patches.

14. A method of operating an electronic device, the method comprising:

displaying, on a screen, an image including a barcode which is captured by a camera;

localizing the barcode as an object from the captured image;

extracting data from the barcode; and displaying at least one of at least part of the extracted data and information related to the extracted data, on the displayed barcode.

15. An electronic device comprising:

a camera configured to capture an image;

a memory configured to store at least one digital image; and a processor configured to:

receive the captured image from the camera, recognize an object in the captured image, generate a reference object by correcting an error included in the recognized object, and track the object using the generated reference object.

16. An electronic device comprising:

a camera configured to capture an image; and a control unit configured to:

detect a barcode from the captured image, localize the barcode as an object in the captured image, extract data from the barcode, generate an original of the barcode using the data, acquire feature points from the generated original, and track the barcode using the feature points.

17. An electronic device comprising:

a camera configured to capture an image;

a display unit configured to display the captured image including a barcode; and a control unit configured to:

localize the barcode as an object from the captured image, extract the barcode from the captured image, extract data from the barcode, and control the display unit to display at least one of at least part of the data and information related to the data on the displayed barcode.

\* \* \* \* \*